US006686939B1

(12) United States Patent
Haynes

(10) Patent No.: US 6,686,939 B1
(45) Date of Patent: Feb. 3, 2004

(54) METHOD AND SYSTEM FOR NAVIGATING FROM DAY TO MONTH IN AN ELECTRONIC CALENDAR

(75) Inventor: Thomas Richard Haynes, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/544,277

(22) Filed: Apr. 6, 2000

(51) Int. Cl.$^7$ ................................................ G09G 5/00
(52) U.S. Cl. ........................ 345/963; 345/783; 345/808
(58) Field of Search ................................ 345/963, 783, 345/808

(56) References Cited

U.S. PATENT DOCUMENTS

| | | | |
|---|---|---|---|
| 5,199,104 A | | 3/1993 | Hirayama |
| 5,261,079 A | * | 11/1993 | Celi, Jr. ........................ 703/24 |
| 5,307,086 A | | 4/1994 | Griffin et al. ............... 345/146 |
| 5,500,938 A | * | 3/1996 | Cahill et al. ................ 345/856 |
| 5,581,678 A | | 12/1996 | Kahn |
| 5,764,597 A | * | 6/1998 | Shih ........................... 368/29 |
| 5,873,108 A | | 2/1999 | Goyal et al. ................ 707/507 |
| 5,905,492 A | | 5/1999 | Straub ........................ 345/333 |
| 5,936,625 A | | 8/1999 | Kahl et al. .................. 345/351 |
| 6,058,415 A | * | 5/2000 | Polcyn ........................ 709/200 |
| 6,141,649 A | * | 10/2000 | Bull ............................ 705/11 |

OTHER PUBLICATIONS

IBM Technical Disclosure Bulletin, "Two–Level Peek on Container Objects", vol. 36, No. 10, Oct., 1993.
IBM Technical Disclosure Bulletin, "Selectable Monthly Calendar Display", vol. 26, No. 8, Jan., 1984.
IBM Technical Disclosure Bulletin, Space/Time Saving Reference Month, vol. 37, No. 11, Nov., 1994.
IBM Technical Disclosure Bulletin, "Selecting a Daily Calendar from a Monthly Calendar", vol. 26, No. 8, Jan., 1984.

* cited by examiner

Primary Examiner—Kristine Kincaid
Assistant Examiner—Nhon Nguyen
(74) Attorney, Agent, or Firm—Duke W. Yee; A. Bruce Clay; Lisa L. B. Yociss

(57) ABSTRACT

A user may easily select a desired day and month in an electronic calendaring system. The user selects a number representing the desired day from a calendar displayed by the electronic calendaring system. The user is then automatically presented with a list of all the months of a year. The user then selects the desired month from the list, and the user is presented with a visual representation of the desired day and month. The user may select the number representing the desired day by right clicking with a pointing device. Additionally, the automatic presentation of a list of all the months of a year may comprise presenting the user with a pop-up menu.

9 Claims, 4 Drawing Sheets

METHOD AND SYSTEM FOR NAVIGATING FROM DAY TO MONTH IN AN ELECTRONIC CALENDAR

FIELD OF THE INVENTION

This invention relates in general to computer software, and in particular to a method and system for navigating from a day view to a month view in an electronic calendar utilizing fewer operator steps.

BACKGROUND OF THE INVENTION

Users of graphical user interface electronic calendars typically and frequently need to switch views from a given date to another date. Most frequently the new date is in the same year, but often in a different month. Most such calendars provide users with a 'reference calendar' to aid in navigation. As an example of using such a reference calendar, suppose a user is currently viewing calendar information for Jan. 12, 1999. Suppose he now wants to view Sep. 8, 1999. In today's calendaring systems, the user would need to first navigate to the new month (typically by repeatedly clicking the left mouse button on a 'forward' arrow , so to go from January to September would require 8 clicks) and then click on the new day of the month.

What is needed is an alternative method which allows the user to first specify the day of the month, then the month itself.

SUMMARY OF THE INVENTION

Selecting a desired day and month in an electronic calendaring system is enabled by the present invention. A user selects a number representing the desired day from a calendar displayed by the electronic calendaring system. The user is then automatically presented with a list of all the months of a year. The user then selects the desired month from the list, and the user is presented with a visual representation of the desired day and month. The user may select the number representing the desired day by right clicking with a pointing device. Additionally, the automatic presentation of a list of all the months of a year may comprise presenting the user with a pop-up menu.

These and other features, aspects, and advantages of the present invention will become better understood with reference to the following description, appended claims, and accompanying drawings.

BRIEF DESCRIPTION OF THE DRAWINGS

For a more complete understanding of the present invention and for further advantages thereof, reference is now made to the following Detailed Description taken in conjunction with the accompanying drawings, in which:

FIGS. 5–7 illustrate another calendaring technique known in the prior art; and

FIGS. 8–10 illustrate a calendaring technique in accordance with the present invention.

DETAILED DESCRIPTION OF THE INVENTION

Figure 1:
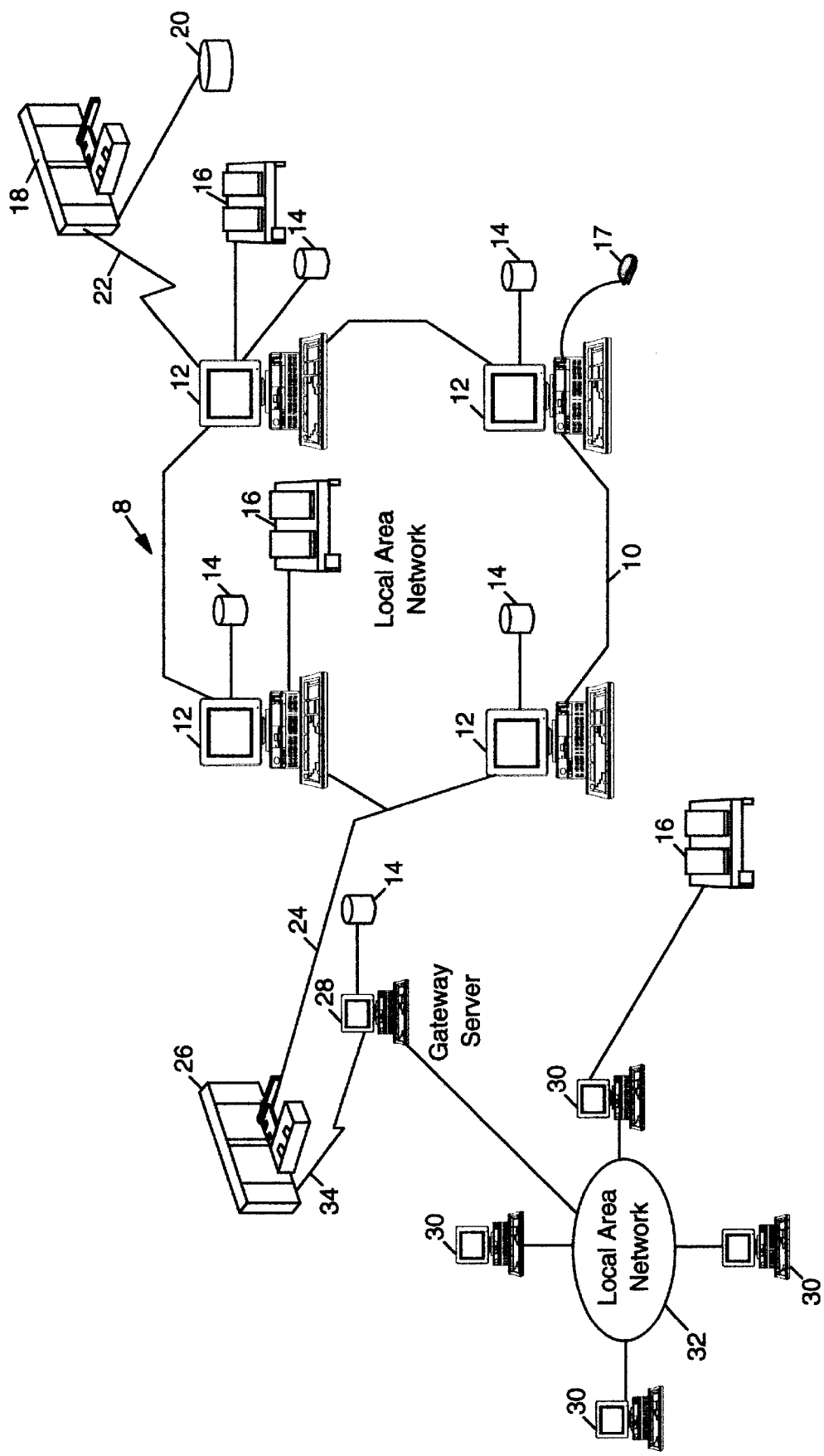
FIG. 1 is a pictorial representation of a data processing system which may be utilized to implement a method and system of the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

Figure 2:
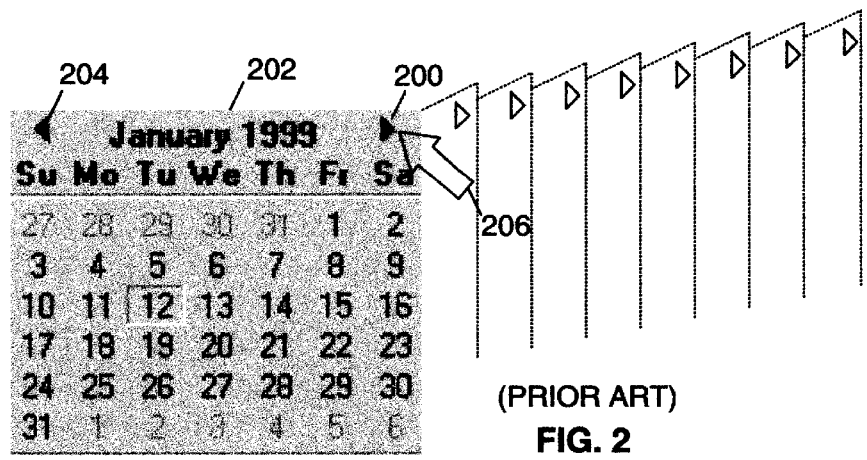
FIGS. 2–4 illustrate a calendaring technique known in the prior art.
Figure 3:
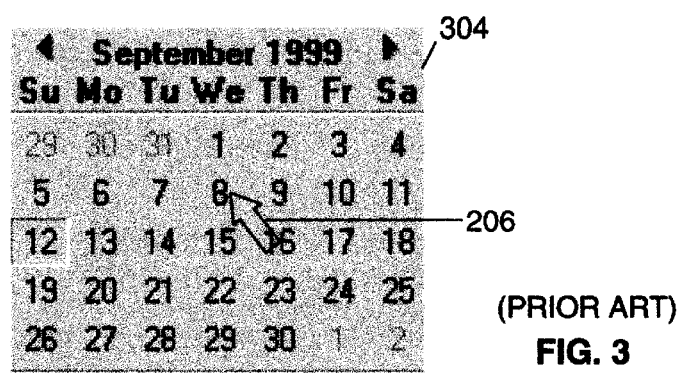
Figure 4:
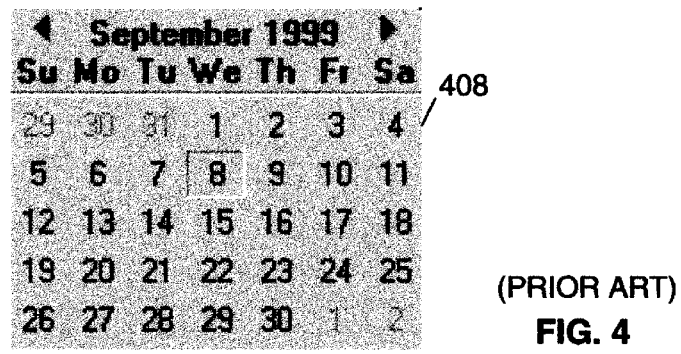

Referring now to FIGS. 2–4, there is shown an electronic calendaring system 202 as known in the prior art. The calendar 202 is a month view with weeks displayed in rows and days displayed in columns. Additionally, there is a forward arrow control 200 and a back arrow control 204. If the user desires to display information for Sep. 8, 1999, the user must activate the forward arrow control 200 eight times (as indicated by dotted lines) with a pointer 206 to display a calendar 304 for September 1999 (FIG. 3). Then, using the pointer 206, the user must select the numeral 8, representing the desired day, to arrive at the desired result as shown in FIG. 4. The user is then free to make changes, add information, etc. to the calendar 408 for the date of Sep. 8, 1999. This method requires many (in this case nine) user steps.

Figure 5:
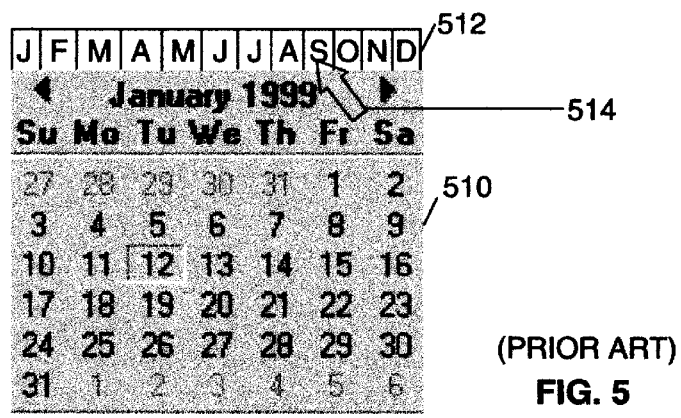

Referring to FIGS. 5–7, another calendaring system 510 as known in the prior art is shown. Calendar 510 is provided with a month bar 512 in any convenient location thereon. By selecting a month on the month bar 512 with a pointer 514, the user is presented with a calendar 600 as shown in FIG. 6. The user must then select the date September 8 with a pointer 616 to arrive at the desired result of Sep. 8, 1999 as shown in calendar 718 of FIG. 7. This method requires at least two steps to obtain the desired date. One problem with this prior art method is that it uses up more of the additional screen space with the month bar 512. The month bar 512 also adds to the visual clutter, promoting user eye fatigue. Finally, the month bar 512 must be small, and therefore requires usage of abbreviations for the month names. Single-letter abbreviations may be necessary, increasing the user's semantic load (have to decipher what month each of the abbreviations resolves to).

Figure 9:
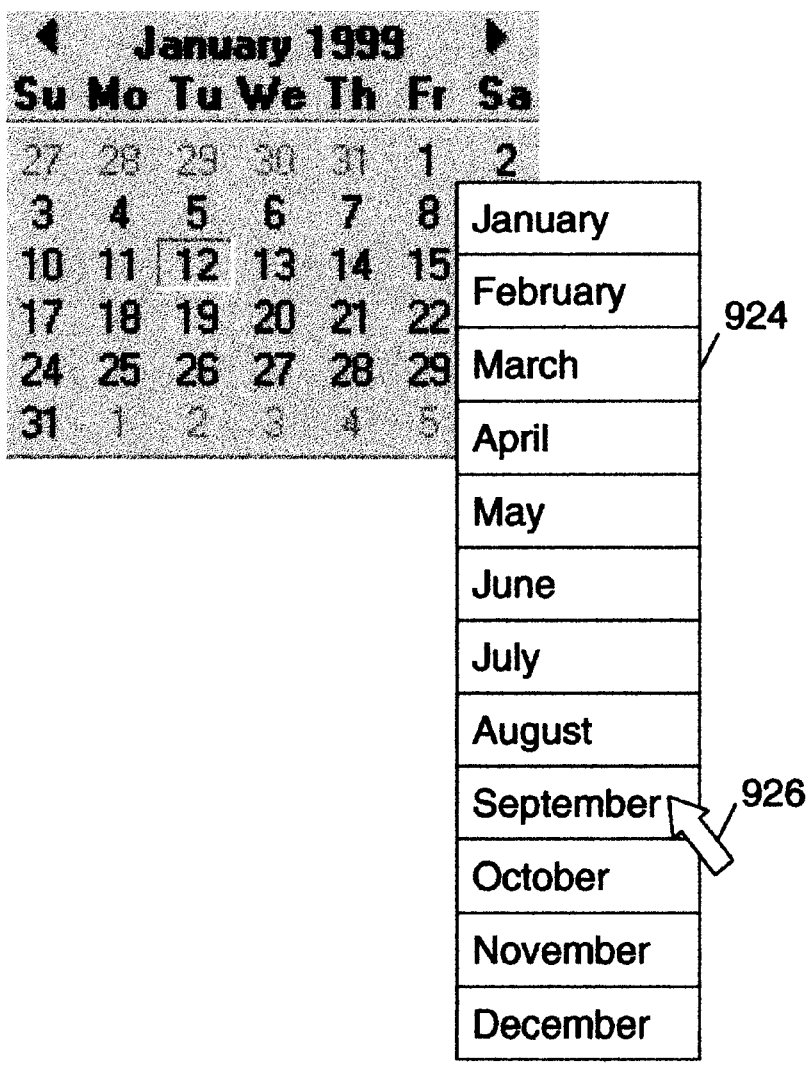
Figure 10:

Referring to FIGS. 8–10, there is shown an electronic calendering system utilizing the benefits of the present invention. Continuing with the same example, the user wants to view data for Sep. 8, 1999. The user right-clicks with a pointer 822 on a desired day of the month (in this example, the 8th) in the reference calendar. A pop-up menu 924 (FIG. 9) then appears. The user must simply slide the pointer 926 to the correct month and select it (in this case September) with the pointer 926. The user is then presented with the desired date. Therefore, in two clicks the user is able to obtain and view the data for any date desired.

This solution results in significantly fewer input device interactions for users in many situations. It is also an enhancement which does not 'muddy up' the interface, nor break or alter the current methods of navigation. It provides a useful alternative option to the user.

Although the present invention has been described with respect to a specific preferred embodiment thereof, various changes and modifications may be suggested to one skilled in the art and it is intended that the present invention encompass such changes and modifications as fall within the scope of the appended claims.

What is claimed is:

1. A method of selecting a desired day and month in an electronic calendaring system, comprising the steps of:
    displaying a depiction of one month of a monthly reference calendar, said depiction including a first plurality of numerals, wherein said first plurality of numerals represents different days of said one month;
    receiving a selection of one of said first plurality of numerals, wherein said one of said first plurality of numerals represents a particular date;
    in response to a receipt of said selection, automatically presenting a list of all months of a year;
    receiving a selection of one of said months of said year from said list;
    in response to a receipt of said selection of said one of said months, automatically displaying a depiction of said selected one of said months; and
    said depiction of said selected one of said months including a selection of one of a second plurality of numerals, wherein said second plurality of numerals represents different days of said selected one of said months, said selected one of said second plurality of numerals representing said particular date.

2. The method of claim 1, wherein said step of receiving a selection of one of said first plurality of numerals further comprises receiving a right click of a pointing device when said pointing device is positioned over said one of said first plurality of numerals.

3. The method of claim 1, wherein said step of automatically presenting a list of all months of a year comprises presenting a pop-up menu.

4. A system for selecting a desired day and month in an electronic calendar, comprising:
    displaying means for displaying a depiction of one month of a monthly reference calendar, said depiction, including a first plurality of numerals, wherein said first plurality of numerals represents different days of said one month;
    receiving means for receiving a selection of one of said first plurality of numerals, wherein said one of said first plurality of numerals represents a particular date;
    in response to a receipt of said selection, presentation means for presenting a list of all months of a year;
    receiving means for receiving a selection of one of said months of said year from said list;
    in response to a receipt of said selection of said one of said months, displaying means for automatically displaying a depiction of said selected one of said months; and
    said depiction of said selected one of said months including a selection of one of a second plurality of numerals, wherein said second plurality of numerals represents different days of said selected one of said months, said selected one of said second plurality of numerals representing said particular date.

5. The system of claim 4, wherein said means for receiving a selection of one of said first plurality of numerals further comprises means for receiving a right click of a pointing device when said pointing device is positioned over said one of said first plurality of numerals.

6. The system of claim 4, wherein said means for automatically presenting a list of all months of a year comprises means for presenting a pop-up menu.

7. A computer program product recorded on computer readable medium for selecting a desired day and month in an electronic calendaring system, comprising:
    computer readable means for displaying a depiction of one month of a monthly reference calendar, said depiction including a first plurality of numerals, wherein said first plurality of numerals represents different days of said one month;
    computer readable means for receiving a selection of one of said first plurality of numerals, wherein said one of said first plurality of numerals represents a particular date;
    in response to a receipt of said selection, computer readable means for automatically presenting a list of all months of a year;
    computer readable means for receiving a selection of one of said months of said year from said list;
    in response to a receipt of said selection of said one of said months, computer readable means for automatically displaying a depiction of said selected one of said months; and
    said depiction of said selected one of said months including a selection of one of a second plurality of numerals, wherein said second plurality of numerals represents different days of said selected one of said months, a said selected ore of said second plurality of numerals representing said particular date.

8. The program product of claim 7, wherein said computer readable means for receiving a selection of one of said first plurality of numerals further comprises computer readable means for receiving a right click of a pointing device when said pointing device is positioned over said one of said first plurality of numerals.

9. The program product of claim 7, wherein said computer readable means for automatically presenting a list of all months of a year comprises computer readable means for presenting a pop-up menu.

* * * * *